US008140902B2

(12) United States Patent
Floyd et al.

(10) Patent No.: US 8,140,902 B2
(45) Date of Patent: Mar. 20, 2012

(54) INTERNALLY CONTROLLING AND ENHANCING ADVANCED TEST AND CHARACTERIZATION IN A MULTIPLE CORE MICROPROCESSOR

(75) Inventors: Michael S. Floyd, Austin, TX (US); Robert B. Gass, Pflugerville, TX (US); Norman K. James, Liberty Hill, TX (US)

(73) Assignee: International Business Machines Corporation, Armonk, NY (US)

( * ) Notice: Subject to any disclaimer, the term of this patent is extended or adjusted under 35 U.S.C. 154(b) by 177 days.

(21) Appl. No.: 12/269,490

(22) Filed: Nov. 12, 2008

(65) Prior Publication Data

US 2010/0122116 A1 May 13, 2010

(51) Int. Cl.
*G06F 11/00* (2006.01)
(52) U.S. Cl. ............................. 714/30; 714/46
(58) Field of Classification Search ............ 714/30
See application file for complete search history.

(56) References Cited

U.S. PATENT DOCUMENTS

| | | | |
|---|---|---|---|
| 6,378,097 B1 | 4/2002 | Fin et al. | |
| 6,571,373 B1 | 5/2003 | Devins et al. | |
| 6,711,447 B1 * | 3/2004 | Saeed | 700/82 |
| 6,732,304 B1 * | 5/2004 | Ong | 714/718 |
| 6,978,234 B1 | 12/2005 | Battaline et al. | |
| 7,133,798 B1 * | 11/2006 | Ong | 702/117 |
| 7,139,945 B2 * | 11/2006 | Ong | 714/718 |
| 7,184,408 B2 * | 2/2007 | Denton et al. | 370/244 |
| 7,290,186 B1 | 10/2007 | Zorian et al. | |
| 7,313,740 B2 * | 12/2007 | Ong | 714/718 |
| 7,353,440 B2 | 4/2008 | Ohwada et al. | |
| 7,523,373 B2 | 4/2009 | Russell et al. | |
| 7,603,605 B2 | 10/2009 | Mittal | |
| 7,665,000 B2 | 2/2010 | Gonzalez et al. | |
| 7,665,005 B2 * | 2/2010 | Szydlowski | 714/745 |
| 7,734,967 B2 | 6/2010 | Chung et al. | |

(Continued)

FOREIGN PATENT DOCUMENTS

JP 2005309867 11/2005

(Continued)

OTHER PUBLICATIONS

U.S. Appl. No. 12/423,442.

(Continued)

*Primary Examiner* — Scott Baderman
*Assistant Examiner* — Kamini Patel
(74) *Attorney, Agent, or Firm* — Stephen R. Tkacs; Stephen J. Walder, Jr.; Diana R. Gerhardt

(57) ABSTRACT

A mechanism is provided for internally controlling and enhancing advanced test and characterization in a multiple core microprocessor. To decrease the time needed to test a multiple core chip, the mechanism uses micro-architectural support that allows one core, a control core, to run a functional program to test the other cores. Any core on the chip can be designated to be the control core as long as it has already been tested for functionality at one safe frequency and voltage operating point. An external testing device loads a small program into the control core's dedicated memory. The program functionally running on the control core uses micro-architectural support for functional scan and external scan communication to independently test the other cores while adjusting the frequencies and/or voltages of the other cores until failure. The control core may independently test the other cores by starting, stopping, and determining pass/fail results.

20 Claims, 4 Drawing Sheets

U.S. PATENT DOCUMENTS

| | | |
|---|---|---|
| 7,774,671 B2 | 8/2010 | Dempsey |
| 7,797,596 B2 | 9/2010 | Dixit et al. |
| 8,001,405 B2 * | 8/2011 | Dittmann et al. ............. 713/320 |
| 2003/0005380 A1 | 1/2003 | Nguyen et al. |
| 2004/0006729 A1 * | 1/2004 | Pendurkar .................... 714/733 |
| 2004/0153793 A1 | 8/2004 | Jarboe, Jr. et al. |
| 2005/0100102 A1 * | 5/2005 | Gazdzinski et al. .......... 375/242 |
| 2005/0102565 A1 | 5/2005 | Barr et al. |
| 2005/0162182 A1 * | 7/2005 | Ong ............................... 324/765 |
| 2005/0235263 A1 * | 10/2005 | Bundy et al. .................. 717/124 |
| 2005/0240850 A1 | 10/2005 | Ohwada et al. |
| 2005/0289286 A1 * | 12/2005 | Ohwada ............................ 711/1 |
| 2005/0289428 A1 * | 12/2005 | Ong ............................ 714/742 |
| 2006/0248394 A1 | 11/2006 | McGowan |
| 2006/0248395 A1 | 11/2006 | McGowan |
| 2006/0277436 A1 | 12/2006 | McGowan |
| 2007/0022342 A1 | 1/2007 | Picano et al. |
| 2007/0130489 A1 | 6/2007 | Kiryu et al. |
| 2007/0168808 A1 * | 7/2007 | Ong ............................... 714/731 |
| 2007/0168809 A1 | 7/2007 | Kiryu et al. |
| 2007/0260823 A1 | 11/2007 | Dickinson et al. |
| 2008/0016404 A1 * | 1/2008 | Ishikawa et al. ................ 714/43 |
| 2008/0082881 A1 * | 4/2008 | Szydlowski ................... 714/731 |
| 2008/0168318 A1 * | 7/2008 | DeMent et al. ................ 714/745 |
| 2009/0138737 A1 * | 5/2009 | Kim et al. ...................... 713/322 |
| 2010/0023807 A1 * | 1/2010 | Wu et al. .......................... 714/30 |
| 2010/0262879 A1 | 10/2010 | Floyd et al. |

FOREIGN PATENT DOCUMENTS

| | | |
|---|---|---|
| WO | WO 01/29666 A1 | 4/2001 |

OTHER PUBLICATIONS

Office Action mailed Mar. 23, 2011 for U.S. Appl. No. 12/423,442, 12 pages.

Office Action mailed Jul. 1, 2011 for U.S. Appl. No. 12/423,442, 11 pages.

Response to Office Action filed Jun. 23, 2011, U.S. Appl. No. 12/423,442, 10 pages.

Notice of Allowance mailed Oct. 14, 2011 for U.S. Appl. No. 12/423,442; 8 pages.

Response to Office Action filed with the USPTO on Sep. 29, 2011 for U.S. Appl. No. 12/423,442; 9 pages.

* cited by examiner

INTERNALLY CONTROLLING AND ENHANCING ADVANCED TEST AND CHARACTERIZATION IN A MULTIPLE CORE MICROPROCESSOR

BACKGROUND

1. Technical Field

The present application relates generally to an improved data processing apparatus and method and more specifically to an apparatus and method for internally controlling and enhancing advanced test and characterization in a multiple core microprocessor.

2. Background

A multiple core processor combines two or more independent cores into a single package composed of a single integrated circuit (IC), called a die, or more dies packaged together. For example, a dual-core processor contains two cores, and a quad-core processor contains four cores. A multiple core microprocessor implements multiprocessing in a single physical package. The processors also share the same interconnect to the rest of the system. A system with n cores is effective when it is presented with n or more threads concurrently. Multiple core technology is widely used in many technology areas, especially those of embedded processors, such as network processors and digital signal processors, and in graphical processing units.

With the advent of multiple core processors and on-chip frequency and/or voltage control, new problems and opportunities present themselves. In order to optimize power and performance tradeoffs on multiple core chips during normal operation or runtime, one may wish to adjust on-chip frequency and voltage for each core. Furthermore, to mitigate process yield issues, manufacturers may configure chips with bad cores to operate without the failing core. This means that one must test the functionality and electrical properties of each core independently, which increases the test and characterization time for each chip by a factor of the number of cores on the chip and complicates the manufacturing test procedures.

BRIEF SUMMARY

In one illustrative embodiment, a method, in a data processing system, is provided for internally controlling advanced test and characterization in a multiple core microprocessor. The method comprises receiving a test program at a control core within the multiple core microprocessor. The multiple core microprocessor comprises plurality of processing cores including the control core. The method further comprises setting, by the control core, voltage and frequency for a test core within the plurality of processing cores and performing a test, under control of the control core, on the test core. The method further comprises reading, by the control core, test data from the test core and identifying, by the control core, operational parameters for the test core.

In other illustrative embodiments, a computer program product comprising a computer usable or readable medium having a computer readable program is provided. The computer readable program, when executed on a computing device, causes the computing device to perform various ones, and combinations of, the operations outlined above with regard to the method illustrative embodiment.

In yet another illustrative embodiment, a multiple core microprocessor is provided. The multiple core microprocessor may comprise a plurality of processing cores, including a control core, and a memory coupled to the one or more processors. The memory may comprise instructions which, when executed by the one or more processors, cause the one or more processors to perform various ones, and combinations of, the operations outlined above with regard to the method illustrative embodiment.

These and other features of the illustrative embodiments will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism for internally controlling and enhancing advanced test and characterization in a multiple core microprocessor. To decrease the time needed to test a multiple core chip, the mechanism uses micro-architectural support that allows one core, a control core, to run a functional program to test the other cores. Test time is reduced by eliminating the need to communicate with an external testing device during the test sequence, which is relatively inefficient compared to internal chip communications. Because the speed at which the program runs at-speed on one of the processor cores, many new test opportunities exist that in the past have been prohibitive due to test time and tester memory limitations.

Any core on the chip can be designated to be the control core as long as it has already been tested for functionality at one safe frequency and voltage operating point. An external testing device loads a small program into the control core's dedicated memory, such as the level two (L2) cache. The program functionally running on the control core uses micro-architectural support for functional scan and external scan communication to independently test the other cores while adjusting the frequencies and/or voltages of the other cores until failure. The control core may independently test the other cores by starting, stopping, and determining pass/fail results.

In one embodiment, the control core may perform multiple runs to determine a "solid" pass/fail boundary, such as four passes in a row with no fail, for instance. In another embodiment, the control core may sample built-in sensors, such as temperature, amperage, voltage, critical path monitors, etc.

For example, the control core may determine the amount of power being consumed by a given core during the test and look for maximum frequency at a prescribed power and/or voltage limit to allow the parts to be sorted into bins or buckets in the process of determining yield.

Figure 1:
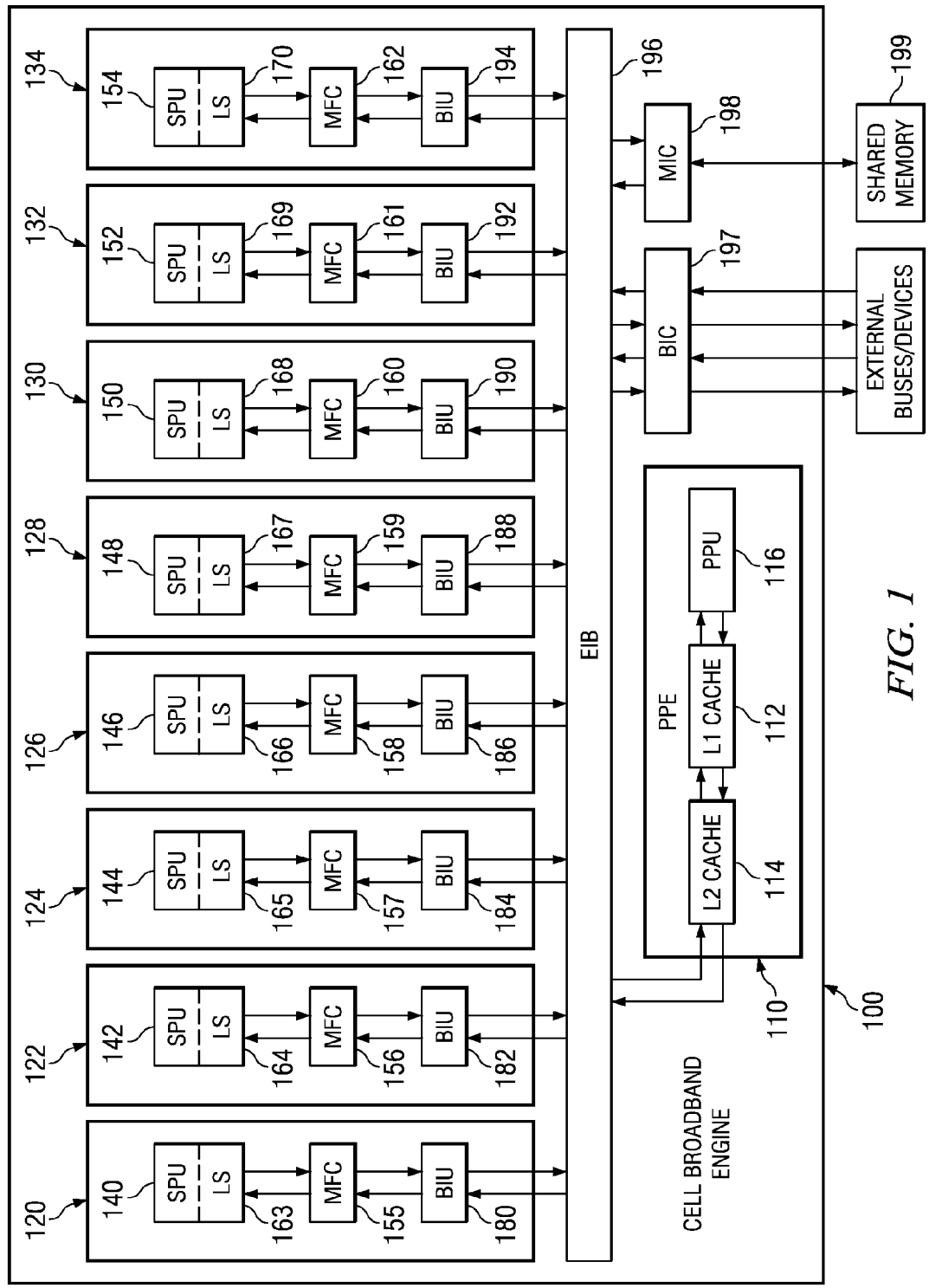
FIG. 1 is an exemplary block diagram of a data processing system in which aspects of the present invention may be implemented.

Thus, the illustrative embodiments may be utilized in many different types of multiple core data processing environments including system-on-a-chip environments, heterogeneous multiple processor environments, or the like. In order to provide a context for the description of the specific elements and functionality of the illustrative embodiments, FIG. 1 is provided hereafter as an example environment in which aspects of the illustrative embodiments may be implemented. While the description following FIG. 1 will focus primarily on a single data processing device implementation, this is only an example and is not intended to state or imply any limitation with regard to the features of the present invention.

With reference now to the figures and in particular with reference to FIG. 1, an example diagram of a data processing environment is provided in which illustrative embodiments of the present invention may be implemented. It should be appreciated that FIG. 1 is only an example and is not intended to assert or imply any limitation with regard to the environments in which aspects or embodiments of the present invention may be implemented. Many modifications to the depicted environment may be made without departing from the spirit and scope of the present invention.

FIG. 1 is an exemplary block diagram of a data processing system in which aspects of the present invention may be implemented. The exemplary data processing system shown in FIG. 1 is an example of the Cell Broadband Engine™ (Cell/B.E.™) data processing system. While the Cell/B.E.™ data processing system will be used in the description of the preferred embodiments of the present invention, the present invention is not limited to such, as will be readily apparent to those of ordinary skill in the art upon reading the following description. CELL BROADBAND ENGINE and CELL/B.E. are trademarks of Sony Computer Entertainment, Inc., in the United States, other countries, or both.

As shown in FIG. 1, the Cell/B.E.™ data processing system 100 includes a power processor element (PPE) 110 having a processor (PPU) 116 and its L1 and L2 caches 112 and 114, and multiple synergistic processor elements (SPEs) 120-134 that each has its own synergistic processor unit (SPU) 140-154, memory flow control 155-162, local memory or store (LS) 163-170, and bus interface unit (BIU unit) 180-194 which may be, for example, a combination direct memory access (DMA), memory management unit (MMU), and bus interface unit. A high bandwidth internal element interconnect bus (EIB) 196, a bus interface controller (BIC) 197, and a memory interface controller (MIC) 198 are also provided.

The local memory or local store (LS) 163-170 is a non-coherent addressable portion of a large memory map which, physically, may be provided as small memories coupled to the SPUs 140-154. The local stores 163-170 may be mapped to different address spaces. These address regions are continuous in a non-aliased configuration. A local store 163-170 is associated with its corresponding SPU 140-154 and SPE 120-134 by its address location, such as via the SPU Identification Register, described in greater detail hereafter. Any resource in the system has the ability to read/write from/to the local store 163-170 as long as the local store is not placed in a secure mode of operation, in which case only its associated SPU may access the local store 163-170 or a designated secured portion of the local store 163-170.

The Cell/B.E.™ data processing system 100 may be a system-on-a-chip such that each of the elements depicted in FIG. 1 may be provided on a single microprocessor chip.

Moreover, the Cell/B.E.™ data processing system 100 is a heterogeneous processing environment in which each of the SPUs may receive different instructions from each of the other SPUs in the system. Moreover, the instruction set for the SPUs is different from that of the PPU, e.g., the PPU may execute Reduced Instruction Set Computer (RISC) based instructions while the SPU execute vectorized instructions.

The SPEs 120-134 are coupled to each other and to the L2 cache 114 via the EIB 196. In addition, the SPEs 120-134 are coupled to MIC 198 and BIC 197 via the EIB 196. The MIC 198 provides a communication interface to shared memory 199. The BIC 197 provides a communication interface between the Cell/B.E.™ data processing system 100 and other external buses and devices.

The PPE 110 is a dual threaded PPE 110. The combination of this dual threaded PPE 110 and the eight SPEs 120-134 makes the Cell/B.E.™ data processing system 100 capable of handling 10 simultaneous threads and over 128 outstanding memory requests. The PPE 110 acts as a controller for the other eight SPEs 120-134 which handle most of the computational workload. The PPE 110 may be used to run conventional operating systems while the SPEs 120-134 perform vectorized floating point code execution, for example.

The SPEs 120-134 comprise a synergistic processing unit (SPU) 140-154, memory flow control units 155-162, local memory or store 163-170, and an interface unit 180-194. The local memory or store 163-170, in one exemplary embodiment, comprises a 256 KB instruction and data memory which is visible to the PPE 110 and can be addressed directly by software.

The PPE 110 may load the SPEs 120-134 with small programs or threads, chaining the SPEs together to handle each step in a complex operation. For example, a set-top box incorporating the Cell/B.E.™ data processing system 100 may load programs for reading a DVD, video and audio decoding, and display, and the data would be passed off from SPE to SPE until it finally ended up on the output display. At 4 GHz, each SPE 120-134 gives a theoretical 32 GFLOPS of performance with the PPE 110 having a similar level of performance.

The memory flow control units (MFCs) 155-162 serve as an interface for an SPU to the rest of the system and other elements. The MFCs 155-162 provide the primary mechanism for data transfer, protection, and synchronization between main storage and the local storages 163-170. There is logically an MFC for each SPU in a processor. Some implementations can share resources of a single MFC between multiple SPUs. In such a case, all the facilities and commands defined for the MFC must appear independent to software for each SPU. The effects of sharing an MFC are limited to implementation-dependent facilities and commands.

Figure 2A:
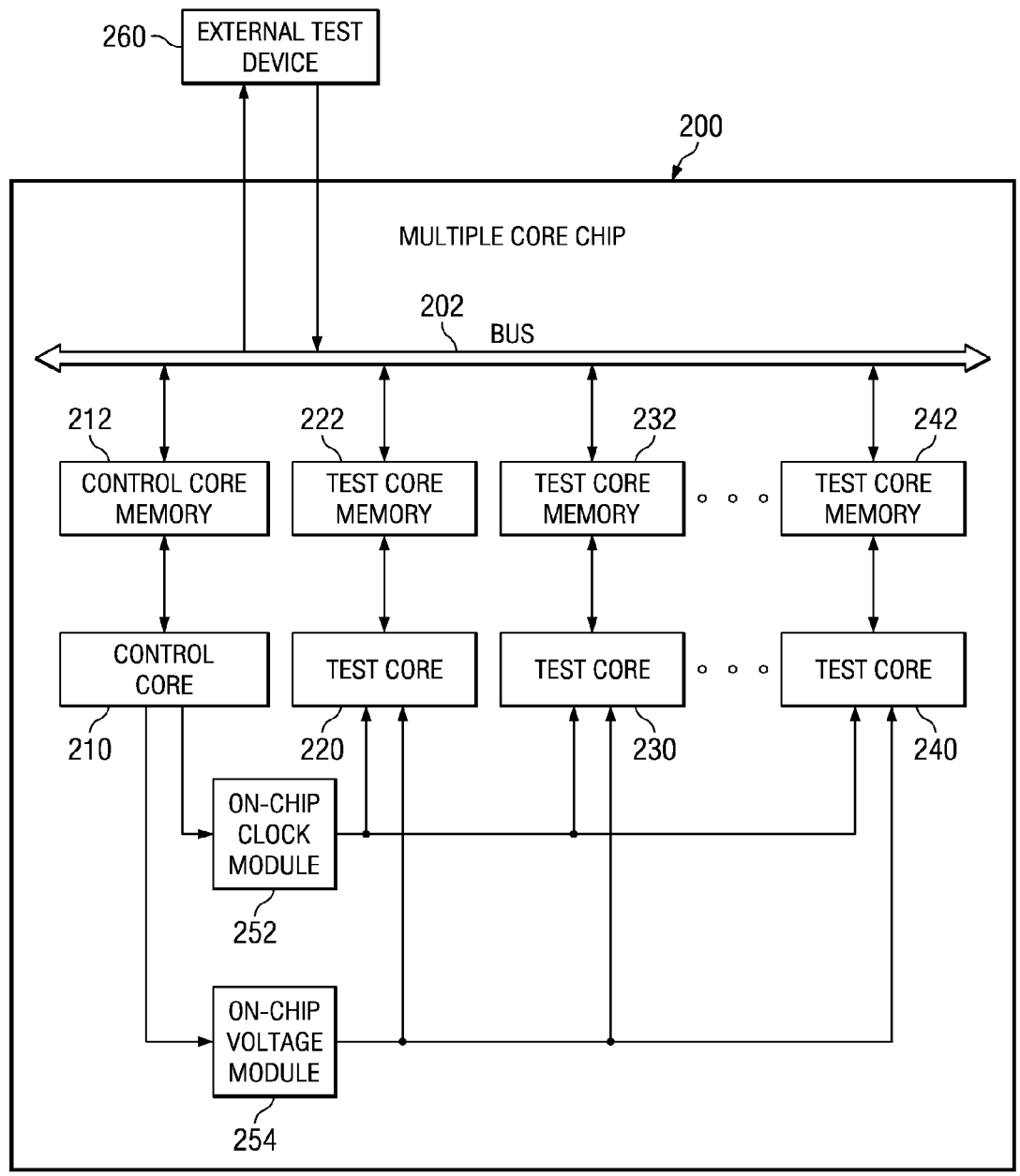
FIGS. 2A and 2B are block diagrams illustrating a mechanism for internally controlling and enhancing advanced test and characterization in a multiple core microprocessor in accordance with an illustrative embodiment.
Figure 2B:
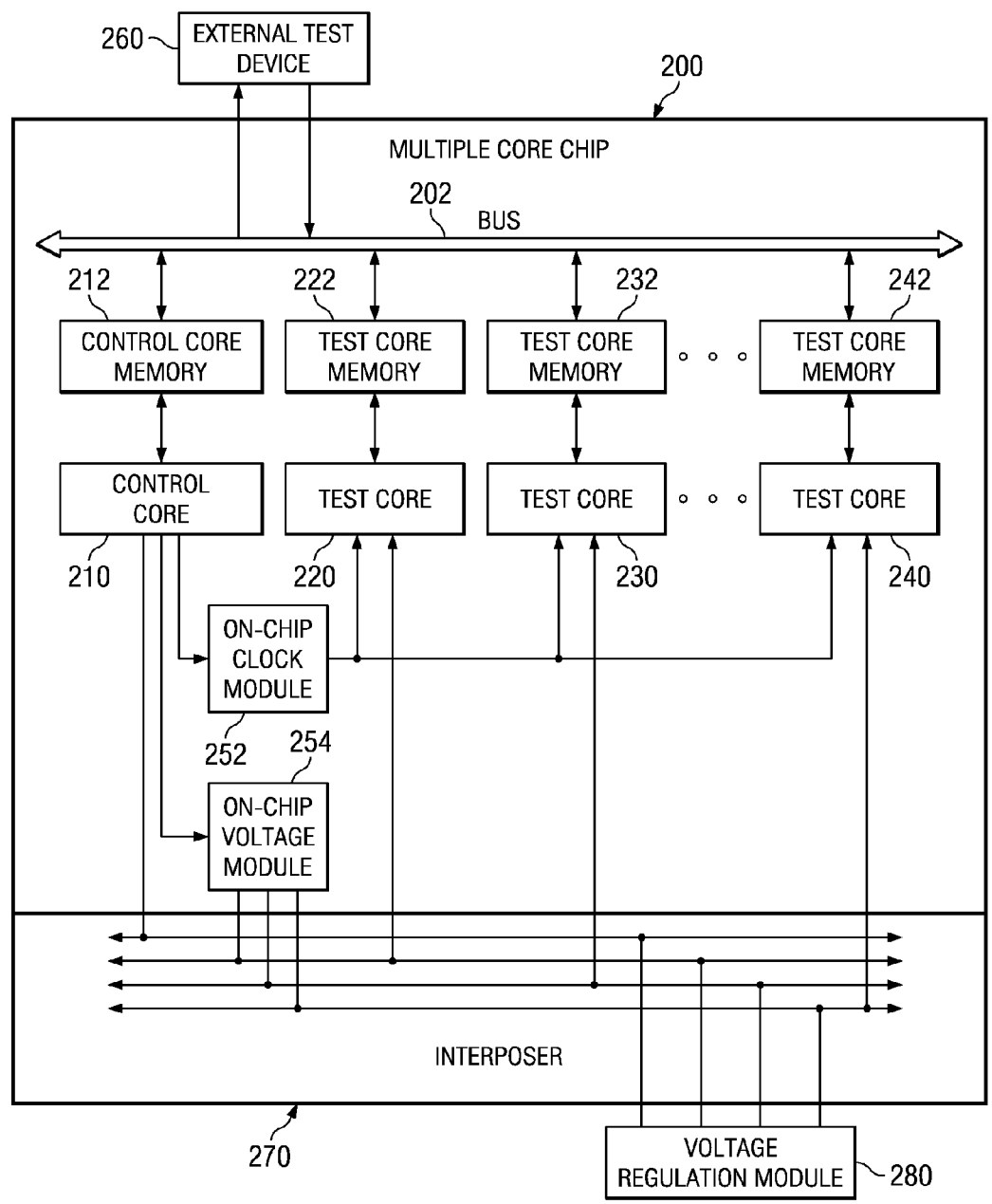

FIGS. 2A and 2B are block diagrams illustrating a mechanism for internally controlling and enhancing advanced test and characterization in a multiple core microprocessor in accordance with an illustrative embodiment. With reference to FIG. 2A, multiple core chip 200 may comprise a control core 210 and a plurality of test cores 220, 230, 240. Multiple core chip 200 may be the Cell Broadband Engine™ data processing system 100 in FIG. 1, for example. Control core 210 may be power processing element (PPE) 110, for example; however, control core 210 may be any core on a multiple core chip as long as it has already been tested for functionality at a safe frequency and voltage operating point. Test cores 220, 230, 240 may be synergistic processing elements 120-134 in FIG. 1, for example. While the example shown in FIG. 2 shows at least three test cores 220, 230, 240, the multiple core chip may include more or fewer test cores without departing from the spirit and scope of the illustrative embodiment. In fact, in an alternative embodiment, multiple core chip 200 may include a plurality of control cores.

External test device 260 loads a small program into control core memory 212 via bus 202. Control core 210 may load test programs into test core memories 222, 232, 242 to be run on test cores 220, 230, 240. The program functionality running on control core 210 may use micro-architectural support for functional scan and external scan communication to independently test the other cores. That is, control core 210 may send instructions to start, stop, and determine pass/fail results using micro-architectural support. Test cores 220, 230, 240 may store results in test core memories 222, 232, 242.

Control core memory 212 may be, for example, L2 cache 114 in FIG. 1. Test core memories 222, 232, 242 may be, for example, local stores, such as local stores 163-170, for example. Alternatively, test core memories 222, 232, 242 may comprise registers or trace arrays associated with test cores 220, 230, 240. Test core 210 may communicate with test cores 220, 230, 240 by setting and reading registers within test core memories 222, 232, 242. Alternatively, control core 210 may communicate with test cores 220, 230, 240 by setting registers in control core memory 212, where test cores 220, 230, 240 may be configured to poll the registers in control core memory 212.

More particularly, control core 210 may communicate with on-chip clock module 252 and on-chip voltage module 254 to adjust the frequency and/or voltage of the test cores 220, 230, 240. For example, control core 210 may communicate with on-chip clock module 252 to increase the frequency of test core 220 until failure. As another example, control core 210 may communicate with on-chip voltage module 254 to decrease the voltage to core 230 until failure.

On-chip clock module 252 may comprise digital phase lock loop (PLL) circuits or similar digitally controlled on-chip clock generation circuits. A phase lock loop (PLL) is a control system that generates a signal that has a fixed relation to the phase of a reference signal. A PLL circuit responds to both the frequency and the phase of the input signal, automatically raising or lowering the frequency of a controlled oscillator until it is matched to the reference in both frequency and phase. PLL circuits are widely used in radio, telecommunications, computers and other electronic applications. They may generate stable frequencies, recover a signal from a noisy communication channel, or distribute clock timing pulses in digital logic designs such as microprocessors. Since a single integrated circuit can provide a complete PLL building block, the technique is widely used in modern electronic devices with output frequencies from a fraction of a cycle per second up to many GHz.

On-chip voltage module 254 may alter the voltage to test cores 220, 230, 240 under control of control core 210. On-chip voltage module 254 may include, for example, voltage divider networks or other circuitry to individually modify the voltage to test cores 220, 230, 240.

In an alternative embodiment, as shown in FIG. 2B, on-chip voltage module 254 modifies voltage identifiers (VIDs) of test cores 220, 230, 240 through interposer 270. An interposer is an electrical interface routing between one socket or connection to another. The purpose of interposer 270 is to reroute a connection to a different connection. Thus, voltage regulator module 280 may read a VID from on-chip voltage module 254, through interposer 270, instead of test core 220. This allows control core 210 to modify VIDs for test cores 220, 230, 240 independently to control the voltage being provided to the test cores.

In one embodiment, control core 210 performs a simple linear or binary search to find a maximum working frequency at selected voltage levels. Multiple runs may be performed for each test core 220, 230, 240 to determine a solid pass/fail boundary, such as, for example, four passes in a row with no fail. Furthermore, control core 210 may read built-in sensors to sample temperature, amperage, voltage, critical path monitors, etc. For example, if current sensors are present, control core 210 may determine an amount of power being consumed by a test core during the test and look for a maximum frequency at a prescribed power and/or voltage limit to allow chips to be sorted into bins/buckets in the process of determining yield.

Control core 210 may store results in control core memory 212. Furthermore, control core 210 may set a "done" bit in a register in control core memory 212, and external test device 260 may poll the done bit to determine whether the test is completed. When the external test device 260 determines that the done bit is set in control core memory 212, external test device may query control core memory 212, or an on-chip trace array (not shown), for result information.

Thus, in accordance with the illustrative embodiments, external test device 260 may load a small program into control core memory 212, wait for the test to complete, and retrieve result data from control core memory 212. As such, external test device 260 may quickly and efficiently determine the operational parameters for multiple core microprocessor chip 200 including multiple permutations of the plurality of cores 210, 220, 230, 240. Micro-architectural support, on-chip frequency control, and on-chip voltage control allow multiple core microprocessor chip 200 to control its own frequency and voltage in a test environment, thus eliminating the need to communicate with external test device 260 during the test sequence. Off-chip communication is relatively inefficient compared to internal chip communications. Because of the speed at which the program runs on one of the cores, many new test opportunities exist that in the past would have been prohibitive, or at least extremely inefficient, due to test time and tester memory limitations.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 3:
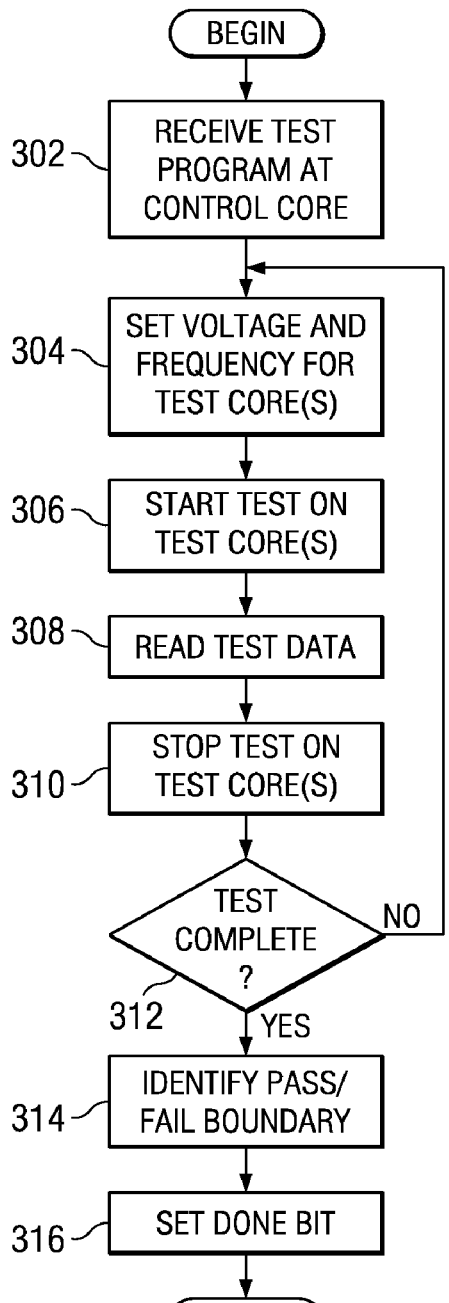
FIG. 3 is a flowchart outlining example operations of a control core for internally controlling and enhancing advanced test and characterization in a multiple core microprocessor in accordance with an illustrative embodiment.

FIG. 3 is a flowchart outlining example operations of a control core for internally controlling and enhancing advanced test and characterization in a multiple core microprocessor in accordance with an illustrative embodiment. Operation begins, and the control core receives a test program within its dedicated memory (block 302). The control core then sets voltage and frequency on-chip for one or more test cores within the multiple core microprocessor (block 304). In one embodiment, the control core tests only a single test core at a time to determine individual operational parameters for each core. In an alternative embodiment, the control core may test a plurality of cores in parallel to determine combinations of cores and operational parameters for each combination. For example, if the multiple core microprocessor has eight cores, the control core may identify a combination of four cores with the best operational parameters for a particular purpose. Then, all but those four cores may be disabled to yield a high-performance quad-core microprocessor chip.

Next, the control core starts the test on the test core(s) (block 306). The control core may use micro-architectural support to communicate test start and stop events. The control core reads test data by reading registers, sensors, or trace array data (block 308). Thereafter, the control core stops the test on the test core(s) (block 310) and determines whether the test process is complete (block 312). In block 312, the test may be complete, for example, when the control core has run through all frequencies for all selected voltage values for all cores or combinations of cores.

If the test is not complete, operation returns to block 304 to set voltage and frequency on-chip for one or more cores. This process may repeat multiple times for each core to identify frequency, voltage, and power limits for each core or for combinations of cores and pass/fail boundaries. The control core may store intermediate results to be queried by the external test device.

If the test is complete in block 312, the control core may identify pass/fail boundaries for the test cores (block 314). For example, the control core may perform a linear or binary search to identify a maximum frequency at selected voltage levels. Because the control core may perform multiple runs for each frequency and voltage and core, the control core may identify a "solid" pass/fail boundary, such as four passes in a row without a fail. The control core may also sample built-in sensors to provide more detailed operational parameters. The built-in sensors may include, for example, temperature, amperage, voltage, critical path monitors, etc. For instance, if current sensors are present, the control core may determine the amount of power being consumed by a test core during the test and look for a maximum frequency at a prescribed power and/or voltage limit to allow parts to be sorted into bins/buckets in the process of determining yield. When the control core has completed the test and identified and stored all the pass/fail boundary information, the control core sets a done bit (block 316), and operation ends.

Figure 4:
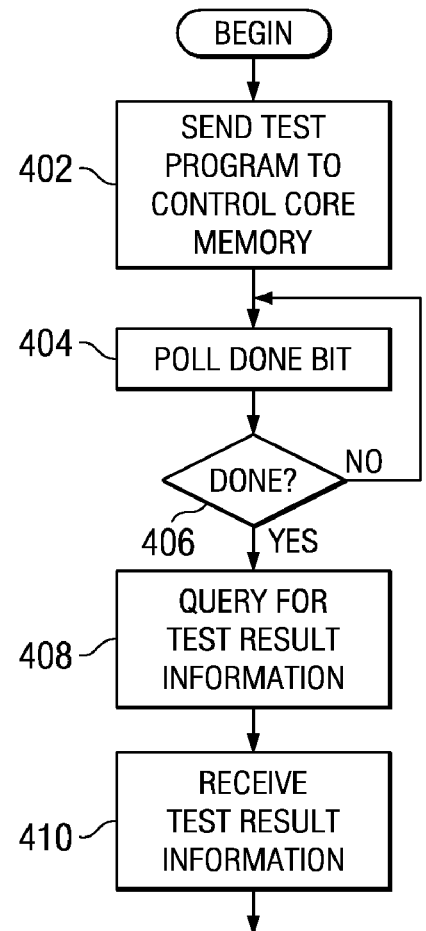
FIG. 4 is a flowchart outlining example operations of an external test device for advanced test and characterization in a multiple core microprocessor in accordance with an illustrative embodiment.

FIG. 4 is a flowchart outlining example operations of an external test device for advanced test and characterization in a multiple core microprocessor in accordance with an illustrative embodiment. Operation begins and the external test device sends a test program to a dedicated memory of an identified control core (block 402). Then, the external test device polls a done bit that is set by the control core when the internally controlled test is completed (block 404). The external test device determines whether the done bit is set (block 406). If the done bit is not set, operation returns to block 404 to poll the done bit. The external test device polls the done bit until the control core on the multiple core microprocessor completes the test.

If the done bit is set in block 406, the external test device queries for test result information (block 408). The control core may store the test result information in the dedicated memory of the control core. The test result information may include the pass/fail boundary information, operational parameter information for individual cores and combinations of cores, intermediate results, etc. The external device then receives the test result information (block 410). Thereafter, operation ends.

Thus, the illustrative embodiments provide mechanisms for internally controlling and enhancing advanced test and characterization in a multiple core microprocessor. To decrease the time needed to test a multiple core chip, the mechanism uses micro-architectural support that allows one core, a control core, to run a functional program to test the other cores. Test time is reduced by eliminating the need to communicate with an external testing device during the test sequence, which is relatively inefficient compared to internal chip communications. Because the speed at which the program runs at-speed on one of the processor cores, many new test opportunities exist that in the past have been prohibitive due to test time and tester memory limitations.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for internally controlling advanced test and characterization in a multiple core microprocessor chip, the method comprising:
receiving a test program at a control core within the multiple core microprocessor chip, wherein the multiple core microprocessor chip comprises a plurality of processing cores including the control core;
setting, by the control core, voltage and frequency for a test core within the plurality of processing cores;
performing a test, under control of the control core, on the test core;
reading, by the control core, test data from the test core; and
identifying, by the control core, operational parameters for the test core.

2. The method of claim 1, wherein performing the test comprises:
starting, by the control core, the test on the test core using micro-architectural support; and
stopping, by the control core, the test on the test core using micro-architectural support.

3. The method of claim 1, wherein reading test data comprises:
determining a pass/fail result using micro-architectural support.

4. The method of claim 1, wherein reading test data comprises:
sampling one or more built-in sensors associated with the test core.

5. The method of claim 1, wherein setting frequency for the test core comprises setting a digital phase lock loop circuit to generate a clock signal for the given test core.

6. The method of claim 1, wherein setting voltage for the test core comprises adjusting a voltage divider network for the given test core.

7. The method of claim 1, wherein setting voltage for the test core comprises setting a voltage identifier for the given test core.

8. The method of claim 1, wherein identifying operational parameters for the test core comprises performing multiple runs of the test on the test core to determine a pass/fail boundary.

9. The method of claim 1, wherein identifying operational parameters for the test core comprises identifying a maximum frequency at a prescribed voltage limit.

10. The method of claim 1, further comprising:
storing, by the control core, test result data in a control core memory; and
setting, by the control core, a flag indicating that the test is complete.

11. A computer program product comprising a computer storage medium having a computer readable program stored thereon, wherein the computer readable program, when executed on a control core within a multiple core microprocessor chip having a plurality of processing cores including the control core, causes the control core to:
- set voltage and frequency for a test core within the plurality of processing cores;
- perform a test, under control of the control core, on the test core;
- read test data from the test core; and
- identify operational parameters for the test core.

12. The computer program product of claim 11, wherein reading test data comprises:
- sampling one or more built-in sensors associated with the test core.

13. The computer program product of claim 11, wherein identifying operational parameters for the test core comprises performing multiple runs of the test on the test core to determine a pass/fail boundary.

14. The computer program product of claim 11, wherein identifying operational parameters for the test core comprises identifying a maximum frequency at a prescribed voltage limit.

15. The computer program product of claim 11, wherein the computer readable program further causes the control core to:
- store test result data in a control core memory; and
- set a flag indicating that the test is complete.

16. A multiple core microprocessor chip, comprising:
- a plurality of processing cores including a control core; and
- a memory coupled to the control core, wherein the memory comprises instructions which, when executed by the control core, cause the control core to:
- set voltage and frequency for a test core within the plurality of processing cores;
- perform a test on the test core;
- read test data from the test core; and
- identify operational parameters for the test core.

17. The multiple core microprocessor chip of claim 16, wherein setting frequency for the test core comprises setting a digital phase lock loop circuit to generate a clock signal for the given test core.

18. The multiple core microprocessor chip of claim 16, wherein setting voltage for the test core comprises adjusting a voltage divider network for the given test core.

19. The multiple core microprocessor of claim 16, wherein setting voltage for the test core comprises setting a voltage identifier for the given test core.

20. The multiple core microprocessor chip of claim 16, wherein the instructions further cause the control core to:
- store test result data in a control core memory coupled to the control core; and
- set a flag indicating that the test is complete.

* * * * *